No. 767,358. PATENTED AUG. 9, 1904.
W. N. SHEPHARD.
AUXILIARY CONNECTION FOR CAR COUPLINGS.
APPLICATION FILED APR. 20, 1904.
NO MODEL.
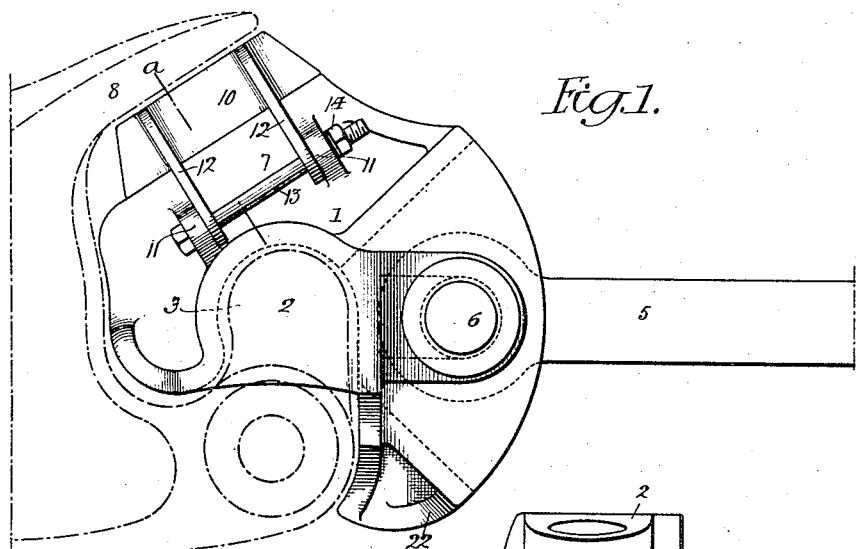
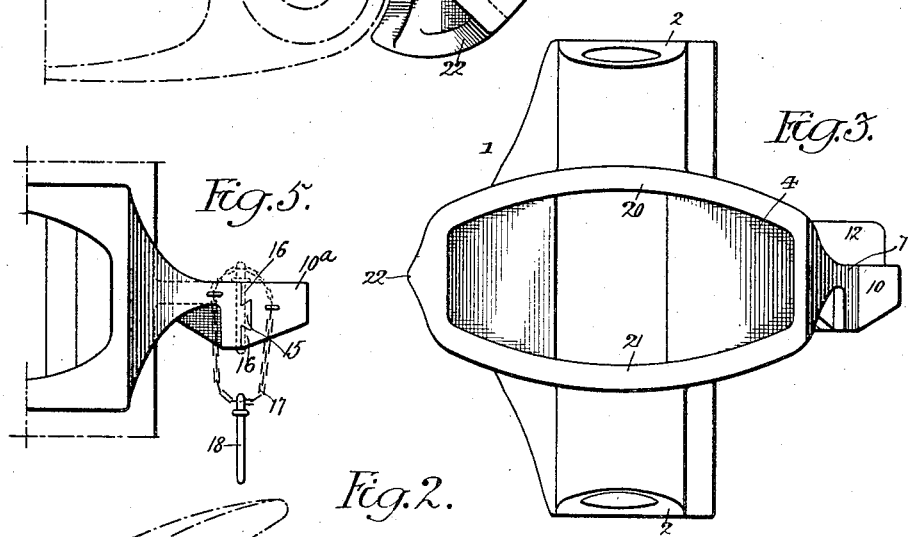
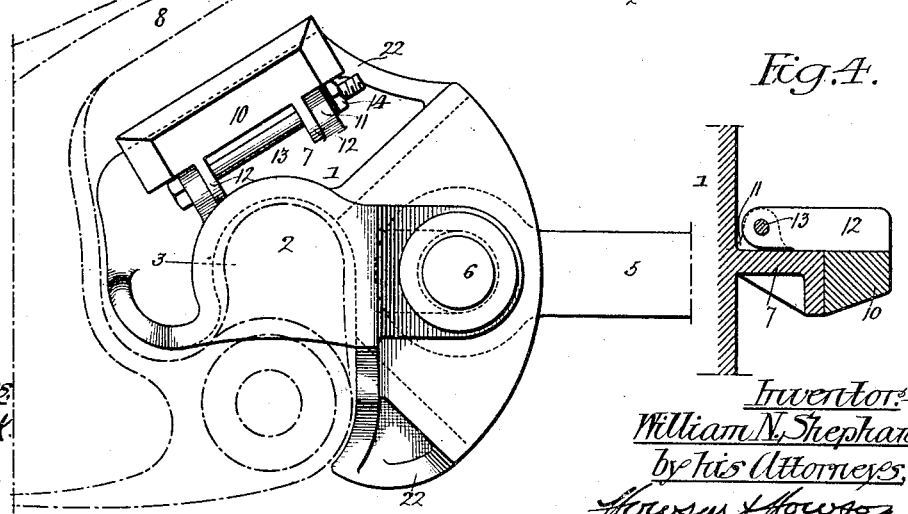
Inventor:
William N. Shephard
by his Attorneys,
Howson & Howson No. 767,358. Patented August 9, 1904.

UNITED STATES PATENT OFFICE.

WILLIAM N. SHEPHARD, OF PHILADELPHIA, PENNSYLVANIA.

AUXILIARY CONNECTION FOR CAR-COUPLINGS.

SPECIFICATION forming part of Letters Patent No 767,358, dated August 9, 1904.

Application filed April 20, 1904. Serial No. 204,025. (No model.)

*To all whom it may concern:*

Be it known that I, WILLIAM N. SHEPHARD, a citizen of the United States, residing in Philadelphia, Pennsylvania, have invented certain Improvements in Auxiliary Connections for Car-Couplings, of which the following is a specification.

My invention relates to certain improvements in the heads or coupling members employed with the auxiliary connection for car-couplings described and claimed in my Patent No. 746,588, dated December 8, 1903, the object of my present invention being to facilitate the engagement of these coupling-heads or coupling members with the couplers carried by the cars.

As described in my patent above referred to, the object of an auxiliary connection of this character is to provide means for coupling cars employing solid-knuckle coupling members, more particularly freight-cars, when it is desired to move the same upon curves of short radius. The intent and purpose of such auxiliary couplings is fully described in my patent, to which reference is made. Hence it is unnecessary to consider the subject at length herein.

My present invention is fully illustrated in the accompanying drawings, in which—

Figure 1 is a plan view of a head or coupling member forming the subject of my present invention, showing the same in position in connection with the ordinary coupler of the Master Car-Builders' or Janney type. Fig. 2 is a similar plan view showing the structure in the position it occupies when being engaged with the coupler carried by the car. Fig. 3 is a front elevation of the head or coupling member forming the subject of my present invention. Fig. 4 is a cross-section on the line *a a*, Fig. 1; and Fig. 5 is a view illustrating a modified detail of my invention.

I have found in practice that it is desirable to attach the head or coupling member of the auxiliary connection when the knuckle of the coupler carried by the car is in the closed position; but in applying the head or coupling member shown in my patent to the car such action is impossible, as the filling flanges or projections carried by said head or coupling member are in the way when said structure is being placed in position. This, of course, can be obviated by employing a head or coupling member which may be dropped on the coupling, and such is shown and described in my patent; but there is more or less danger of such structure lifting out of the coupler carried by the car when the strain of pulling or pushing is heavy, and I prefer to employ an auxiliary head or coupling member which has retaining-flanges at top and bottom, also illustrated in my patent.

In the accompanying drawings, 1 represents the head or coupling member, which is provided with the cap or cover pieces or retaining-flanges 2 at the top and bottom to engage the top and bottom of the knuckle, (indicated in the present instance in dotted lines at 3.) The head or coupling member is also provided with a front recess 4 to receive the eyebar 5, which is held to the head or coupling member by means of the usual coupling-pin 6. This head or coupling member 1 carries the usual filling-piece or projection 7 to fill the space of the coupler carried by the car between the fixed projecting portion 8 of the same and its swinging member or knuckle 3. Instead, however, of providing a solid projection or filling-piece, as in my patented structure, which would prevent the engagement of the head or coupling member with the coupler carried by the car unless dropped onto the same or having the knuckle open, I provide such projection with a pivoted portion 10, which may be lifted or swung out of the way when the head or coupling member is being fitted to engage the coupler carried by the car, which filling-piece 10 will drop into proper position to complete the filling of the space after said head or coupling member is positioned. To support this pivoted structure, the head or coupling member 1 is provided with ears 11, and the swinging member 10 has arms 12, and all of these parts have suitable registering apertures for the reception of a bolt 13, which acts as a pivot upon which the pivoted filling-piece can swing. These parts will be secured against disengagement by a nut 14, and by means of this pivoted piece, which can be easily raised to the inoperative position, I can readily enter the auxiliary head or coupling member and remove the same without opening the knuckle of the coupler carried by the car. I prefer to employ a pivoted swinging piece 10, as shown in Figs. 1 and 2, to effect this operation; but in lieu thereof I may provide the head with a dovetail projecting flange 15, as shown in Fig. 5, and slide on the same a filling-piece 10ª, having undercut flanges 16 to engage the dovetail flange 15. This piece 10ª is a separate and independent piece, and to prevent loss or removal I prefer to connect the same with the head by means of a chain 17. To avoid danger of the parts separating when fitted together when the auxiliary head or coupling member is in engagement with one of the couplings carried by the car, I provide a pin 18, carried by said chain, which may be placed in a registering opening between the parts, as clearly shown by dotted lines in Fig. 5.

In the use of a structure of this character the eyebar or other member connecting the heads or coupling members swings at a wide angle when the cars are moving upon curves of short radius, and to bring said connecting-bar into such position with relation to the heads that the strain may be brought upon the strongest part of said heads the front opening 4 has the curved upper and lower walls 20 and 21, so that when the bar is swung at an extreme angle it will be caused to rise on said curved wall and engage the side wall of the opening 4 of the head 1 at or near the center of the same, which wall is strengthened on the outer side by the flanges 22. By this means also I increase the strength of the head or coupling member and at the same time reduce the weight of the same.

Although I have shown and described the head forming the subject of my invention as having one filling-flange, it will be understood that I may provide additional filling-flanges, if necessary for any purpose.

Having thus described my invention, I claim and desire to secure by Letters Patent—

1. As a new article of manufacture, a head forming part of an auxiliary connection for car-coupling, said head being shaped to engage the couplers carried by the cars, and constructed to fill the space between the fixed and swinging portions of the same, said filling structure being made in a plurality of parts.

2. As a new article of manufacture, an interlocking head forming part of an auxiliary connection for car-coupling, said head being shaped to engage the couplers carried by the cars, and having a flange or projection to fill the space between the fixed and swinging portions of the same, said flange or projection being made in a plurality of parts.

3. As a new article of manufacture, a head forming part of an auxiliary connection for car-couplings, said head being shaped to engage the couplers carried by the cars and constructed to fill the space between the fixed and swinging portions of the same, said filling structure being provided with separable parts movably mounted with respect to the same.

4. As a new article of manufacture, an interlocking head forming part of an auxiliary connection for car-couplings, said head being shaped to engage the couplers carried by the cars and having a flange or projection to fill the space between the fixed and swinging portions of the same, said flange or projection being provided with a separable part movably mounted with respect to the same.

5. As a new article of manufacture, a head forming part of an auxiliary connection for car-couplings, said head being shaped to conform to the contour of and constructed to be confined by said coupling member when the pivoted knuckle of the same is in the closed position, said head having means at top and bottom for support and engagement with the coupling member, and constructed to fill the space between the pivoted knuckle and fixed portion of the coupler, said filling structure being made in a plurality of parts.

6. As a new article of manufacture, an interlocking head forming part of an auxiliary connection for car-couplings, said head being shaped to conform to the contour of and constructed to be confined by said coupling member when the pivoted knuckle of the same is in the closed position, said head having means at top and bottom for support and engagement with the coupling member, and having a flange or projection to fill the space between the pivoted knuckle and fixed portion of the coupler, said flange or projection being made in a plurality of parts.

7. As a new article of manufacture, a head forming part of an auxiliary connection for car-couplings, said head having a filling structure for the space between the fixed and movable portion of the car-coupling, having a front recess for the reception of a connecting-bar, and having a curved or concaved wall for said recess whereby when the connecting-bar is extended at an angle to the coupling-head in passing curves of short radius, said bar will be caused to rise and engage the coupling-head at its central portion.

8. As a new article of manufacture, an interlocking head forming part of an auxiliary connection for car-couplings, said head having a flange to fill the space between the fixed and movable portion of the car-coupling, having a front recess for the reception of a connecting-bar, and having curved walls for said recess whereby when the connecting-bar is extended at an angle to the coupling-head in passing curves of short radius, said bar will be caused to rise and engage the coupling-head at its central reinforced portion.

9. As a new article of manufacture, a head forming part of an auxiliary connection for car-couplings, said head being shaped to engage the couplers carried by the cars and having a filling structure for the space between the fixed and swinging portions of the same, said filling structure being made in two parts, one of which is hinged to the other whereby the head or coupling member may be engaged with the car-coupler when the knuckle is in the closed position, the hinged part being raised during this action and dropped when the auxiliary head is in place.

10. As a new article of manufacture, an interlocking head forming part of an auxiliary connection for car-couplings, said head being shaped to engage the couplers carried by the cars and having a flange or projection to fill the space between the fixed and swinging portions of the same, said flange or projection being made in two parts, one of which is hinged to the other whereby the head or coupling member may be engaged with the car-coupler when the knuckle is in the closed position, the hinged part being raised during this action and dropped when the auxiliary head is in place.

In testimony whereof I have signed my name to this specification in the presence of two subscribing witnesses.

WILLIAM N. SHEPHARD.

Witnesses:
MURRAY C. BOYER,
CHARLES C. NORRIS, Jr.